United States Patent
Wakeling et al.

(10) Patent No.: US 10,528,395 B2
(45) Date of Patent: *Jan. 7, 2020

(54) TASK MANAGING APPLICATION FOR PERFORMING TASKS BASED ON MESSAGES RECEIVED FROM A DATA PROCESSING APPLICATION INITIATED BY THE TASK MANAGING APPLICATION

(71) Applicant: Ab Initio Technology LLC, Lexington, MA (US)

(72) Inventors: Tim Wakeling, Park City, UT (US); Mark Buxbaum, Acton, MA (US); Mark Staknis, Concord, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/873,095

(22) Filed: Jan. 17, 2018

(65) Prior Publication Data

US 2018/0143861 A1    May 24, 2018

Related U.S. Application Data

(63) Continuation of application No. 12/704,998, filed on Feb. 12, 2010, now Pat. No. 9,886,319.

(Continued)

(51) Int. Cl.
*G06F 9/46* (2006.01)
*G06F 9/50* (2006.01)

(52) U.S. Cl.
CPC ...... *G06F 9/5038* (2013.01); *G06F 2209/506* (2013.01)

(58) Field of Classification Search
None
See application file for complete search history.

(56) References Cited

U.S. PATENT DOCUMENTS 3,662,401 A   5/1972   Collins et al.
4,228,496 A   10/1980  Katzman et al.
(Continued)

FOREIGN PATENT DOCUMENTS

AU   2014/262225   12/2014
CN   1965296      5/2007
(Continued)

OTHER PUBLICATIONS

"Modular programming" Wikipedia, retrieved Feb. 10, 2009 (2 pages).

(Continued)

*Primary Examiner* — Bradley A Teets
(74) *Attorney, Agent, or Firm* — Fish & Richardson P.C.

(57) ABSTRACT

Managing task execution includes: receiving a specification of a plurality of tasks to be performed by respective functional modules; processing a flow of input data using a dataflow graph that includes nodes representing data processing components connected by links representing flows of data between data processing components; in response to at least one flow of data provided by at least one data processing component, generating a flow of messages; and in response to each of the messages in the flow of messages, performing an iteration of a set of one or more tasks using one or more corresponding functional modules.

22 Claims, 9 Drawing Sheets

Related U.S. Application Data

(60) Provisional application No. 61/152,669, filed on Feb. 13, 2009.

(56) References Cited

U.S. PATENT DOCUMENTS

| | | |
|---|---|---|
| 4,922,418 A | 5/1990 | Dolecek |
| 4,972,314 A | 11/1990 | Getzinger et al. |
| 5,127,104 A | 6/1992 | Dennis |
| 5,276,899 A | 1/1994 | Schneiderman |
| 5,280,619 A | 1/1994 | Wang |
| 5,323,452 A | 6/1994 | Dickman et al. |
| 5,495,590 A | 2/1996 | Comfort et al. |
| 5,504,900 A | 4/1996 | Raz |
| 5,630,047 A | 5/1997 | Wang |
| 5,692,168 A | 11/1997 | McMahan |
| 5,701,400 A | 12/1997 | Amardo |
| 5,712,971 A | 1/1998 | Stanfill et al. |
| 5,745,778 A | 4/1998 | Alfieri |
| 5,799,266 A | 8/1998 | Hayes |
| 5,802,267 A | 9/1998 | Shirakihara et al. |
| 5,805,462 A | 9/1998 | Poirot et al. |
| 5,857,204 A | 1/1999 | Lordi et al. |
| 5,923,832 A | 7/1999 | Shirakihara et al. |
| 5,930,794 A | 7/1999 | Linenbach et al. |
| 5,933,640 A | 8/1999 | Dion |
| 5,950,212 A | 9/1999 | Anderson et al. |
| 5,966,072 A | 10/1999 | Stanfill et al. |
| 5,999,729 A | 12/1999 | Tabloski, Jr. et al. |
| 6,006,242 A | 12/1999 | Poole et al. |
| 6,012,094 A | 1/2000 | Leyman |
| 6,014,670 A | 1/2000 | Zamanian et al. |
| 6,016,516 A | 1/2000 | Horikiri |
| 6,032,158 A | 2/2000 | Mukhopadhhyay et al. |
| 6,038,558 A | 3/2000 | Powers et al. |
| 6,044,211 A | 3/2000 | Jain |
| 6,044,374 A | 3/2000 | Nesamoney et al. |
| 6,088,716 A | 7/2000 | Stanfill et al. |
| 6,173,276 B1 | 1/2001 | Kant et al. |
| 6,208,345 B1 | 3/2001 | Sheard et al. |
| 6,256,637 B1 | 7/2001 | Venkatesh et al. |
| 6,259,988 B1 | 7/2001 | Galkowski et al. |
| 6,272,650 B1 | 8/2001 | Meyer et al. |
| 6,301,601 B1 | 10/2001 | Helland |
| 6,314,114 B1 | 11/2001 | Coyle et al. |
| 6,324,437 B1 | 11/2001 | Frankel et al. |
| 6,330,008 B1 | 12/2001 | Razdow et al. |
| 6,332,212 B1 | 12/2001 | Organ et al. |
| 6,339,775 B1 | 1/2002 | Zamanian et al. |
| 6,400,996 B1 | 6/2002 | Hoffberg et al. |
| 6,401,216 B1 | 6/2002 | Meth et al. |
| 6,437,796 B2 | 8/2002 | Sowizral et al. |
| 6,449,711 B1 | 9/2002 | Week |
| 6,480,876 B2 | 11/2002 | Rehg et al. |
| 6,496,961 B2 | 12/2002 | Gupta et al. |
| 6,538,651 B1 | 3/2003 | Hayman et al. |
| 6,584,581 B1 | 6/2003 | Bay et al. |
| 6,608,628 B1 | 8/2003 | Ross et al. |
| 6,611,862 B2 | 8/2003 | Reisman |
| 6,640,244 B1 | 10/2003 | Bowman-Amuah |
| 6,651,234 B2 | 11/2003 | Gupta et al. |
| 6,654,907 B2 | 11/2003 | Stanfill et al. |
| 6,658,464 B2 | 12/2003 | Reisman |
| 6,728,879 B1 | 4/2004 | Atkinson |
| 6,760,903 B1 | 7/2004 | Morshed et al. |
| 6,813,761 B1 | 11/2004 | Das et al. |
| 6,816,825 B1 | 11/2004 | Ashar et al. |
| 6,832,369 B1 | 12/2004 | Kryka et al. |
| 6,848,100 B1 | 1/2005 | Wu et al. |
| 6,879,946 B2 | 4/2005 | Rong et al. |
| 7,062,483 B2 | 6/2006 | Ferrari et al. |
| 7,082,604 B2 | 7/2006 | Schneiderman |
| 7,085,426 B2 | 8/2006 | August |
| 7,103,597 B2 | 9/2006 | McGovern |
| 7,103,620 B2 | 9/2006 | Kunz et al. |
| 7,130,484 B2 | 10/2006 | August |
| 7,137,116 B2 | 11/2006 | Parkes et al. |
| 7,164,422 B1 | 1/2007 | Wholey et al. |
| 7,165,030 B2 | 1/2007 | Yi et al. |
| 7,167,850 B2 | 1/2007 | Stanfill |
| 7,316,001 B2 | 1/2008 | Gold et al. |
| 7,356,819 B1 | 4/2008 | Ricart et al. |
| 7,398,514 B2 | 7/2008 | Russell |
| 7,412,658 B2 | 8/2008 | Gilboa |
| 7,417,645 B2 | 8/2008 | Beda et al. |
| 7,457,984 B2 | 11/2008 | Kutan |
| 7,467,383 B2 | 12/2008 | Inchingolo et al. |
| 7,505,975 B2 | 3/2009 | Luo |
| 7,577,628 B2 | 8/2009 | Stanfill |
| 7,594,220 B2 | 9/2009 | Kodosky et al. |
| 7,636,699 B2 | 12/2009 | Stanfill |
| 7,716,630 B2 | 5/2010 | Wholey et al. |
| 7,756,940 B2 | 7/2010 | Sagawa |
| 7,840,949 B2 | 11/2010 | Schumacher et al. |
| 7,870,556 B2 | 1/2011 | Wholey et al. |
| 7,877,350 B2 | 1/2011 | Stanfill et al. |
| 7,979,479 B2 | 7/2011 | Staebler et al. |
| 8,286,176 B1 | 10/2012 | Baumback et al. |
| 8,396,886 B1 | 3/2013 | Tsimelzon et al. |
| 8,566,641 B2 | 10/2013 | Douros et al. |
| 9,274,926 B2 | 3/2016 | Larson et al. |
| 9,886,319 B2 * | 2/2018 | Wakeling ............. G06F 9/5038 |
| 2001/0055019 A1 | 12/2001 | Sowizral et al. |
| 2002/0080181 A1 | 6/2002 | Razdow et al. |
| 2002/0091747 A1 | 7/2002 | Rehg et al. |
| 2002/0091748 A1 | 7/2002 | Rehg et al. |
| 2002/0107743 A1 | 8/2002 | Sagawa |
| 2002/0111876 A1 | 8/2002 | Rudraraju et al. |
| 2002/0129340 A1 | 9/2002 | Tuttle |
| 2002/0147745 A1 | 10/2002 | Houben et al. |
| 2002/0184616 A1 | 12/2002 | Chessell et al. |
| 2003/0004771 A1 | 1/2003 | Yaung |
| 2003/0023413 A1 | 1/2003 | Srinivasa |
| 2003/0033432 A1 | 2/2003 | Simpson et al. |
| 2003/0091055 A1 | 5/2003 | Craddock et al. |
| 2003/0126240 A1 | 7/2003 | Vosseler |
| 2004/0006745 A1 | 1/2004 | Van Heldan et al. |
| 2004/0041838 A1 | 3/2004 | Adusumilli et al. |
| 2004/0073529 A1 | 4/2004 | Stanfill |
| 2004/0093559 A1 | 5/2004 | Amaru et al. |
| 2004/0098452 A1 | 5/2004 | Brown et al. |
| 2004/0107414 A1 | 6/2004 | Bronicki et al. |
| 2004/0111469 A1 | 6/2004 | Manion et al. |
| 2004/0148373 A1 | 7/2004 | Childress et al. |
| 2004/0177099 A1 | 9/2004 | Ganesh et al. |
| 2004/0205726 A1 | 10/2004 | Chedgey et al. |
| 2004/0207665 A1 | 10/2004 | Mathur |
| 2004/0225657 A1 | 11/2004 | Sarkar |
| 2004/0260590 A1 | 12/2004 | Golani et al. |
| 2005/0021689 A1 | 1/2005 | Marvin et al. |
| 2005/0033720 A1 | 2/2005 | Verma et al. |
| 2005/0034112 A1 | 2/2005 | Stanfill |
| 2005/0039176 A1 | 2/2005 | Fournie |
| 2005/0059046 A1 | 3/2005 | Labrenz et al. |
| 2005/0086360 A1 | 4/2005 | Mamou et al. |
| 2005/0097515 A1 | 5/2005 | Ribling |
| 2005/0097561 A1 | 5/2005 | Schumacher et al. |
| 2005/0102325 A1 | 5/2005 | Gould et al. |
| 2005/0114778 A1 | 5/2005 | Branson et al. |
| 2005/0144277 A1 | 6/2005 | Flurry et al. |
| 2005/0144596 A1 | 6/2005 | McCullough et al. |
| 2005/0149935 A1 | 7/2005 | Benedetti |
| 2005/0172268 A1 | 8/2005 | Kuturiano et al. |
| 2005/0177531 A1 | 8/2005 | Bracewell |
| 2005/0193056 A1 | 9/2005 | Schaefer et al. |
| 2005/0216421 A1 | 9/2005 | Barry et al. |
| 2005/0240621 A1 | 10/2005 | Robertson et al. |
| 2005/0262470 A1 | 11/2005 | Gavrilov |
| 2005/0289527 A1 | 12/2005 | Illowsky et al. |
| 2006/0085462 A1 | 4/2006 | Todd |
| 2006/0095722 A1 | 5/2006 | Biles et al. |
| 2006/0130041 A1 | 6/2006 | Pramanick et al. |
| 2006/0206872 A1 | 9/2006 | Krishnaswamy |
| 2006/0282474 A1 | 12/2006 | MacKinnon |
| 2006/0294150 A1 | 12/2006 | Stanfill et al. |

(56) References Cited

U.S. PATENT DOCUMENTS

| | | |
|---|---|---|
| 2006/0294459 A1 | 12/2006 | Davis et al. |
| 2007/0011668 A1 | 1/2007 | Wholey et al. |
| 2007/0022077 A1 | 1/2007 | Stanfill |
| 2007/0035543 A1 | 2/2007 | David et al. |
| 2007/0094211 A1 | 4/2007 | Sun et al. |
| 2007/0118839 A1 | 5/2007 | Berstis et al. |
| 2007/0139441 A1 | 6/2007 | Lucas et al. |
| 2007/0143360 A1 | 6/2007 | Harris et al. |
| 2007/0150429 A1 | 6/2007 | Huelsman et al. |
| 2007/0174185 A1 | 7/2007 | McGovern |
| 2007/0198971 A1 | 8/2007 | Dasu |
| 2007/0239766 A1 | 10/2007 | Papaefstathiou et al. |
| 2007/0271381 A1 | 11/2007 | Wholey et al. |
| 2007/0271562 A1 | 11/2007 | Schumacher et al. |
| 2007/0279494 A1 | 12/2007 | Aman et al. |
| 2007/0285440 A1 | 12/2007 | MacInnis et al. |
| 2008/0049022 A1 | 2/2008 | Sherb et al. |
| 2008/0126755 A1 | 5/2008 | Wu et al. |
| 2008/0134138 A1 | 6/2008 | Chamieh |
| 2008/0244524 A1 | 10/2008 | Kelso |
| 2008/0250049 A1 | 10/2008 | Chakra et al. |
| 2008/0288608 A1 | 11/2008 | Johnson |
| 2008/0294615 A1 | 11/2008 | Furuya et al. |
| 2009/0030863 A1 | 1/2009 | Stanfill et al. |
| 2009/0064147 A1 | 3/2009 | Beckerle et al. |
| 2009/0083313 A1 | 3/2009 | Stanfill et al. |
| 2009/0113196 A1 | 4/2009 | Jan et al. |
| 2009/0182728 A1 | 7/2009 | Anderson |
| 2009/0193391 A1 | 7/2009 | Miller et al. |
| 2009/0193417 A1 | 7/2009 | Kahlon |
| 2009/0224941 A1 | 9/2009 | Kansal et al. |
| 2009/0235267 A1 | 9/2009 | McKinney et al. |
| 2009/0245426 A1 | 10/2009 | Ratnaker et al. |
| 2009/0327196 A1 | 12/2009 | Studer et al. |
| 2010/0042976 A1 | 2/2010 | Hines |
| 2010/0070955 A1 | 3/2010 | Kahlon |
| 2010/0169137 A1 | 7/2010 | Jastrebski et al. |
| 2010/0174694 A1 | 7/2010 | Staebler et al. |
| 2010/0180344 A1 | 7/2010 | Malyshev et al. |
| 2010/0211953 A1 | 8/2010 | Wakeling et al. |
| 2010/0218031 A1 | 8/2010 | Agarwal et al. |
| 2010/0281462 A1 | 11/2010 | Festa |
| 2010/0281488 A1 | 11/2010 | Krishnamurthy et al. |
| 2011/0078500 A1 | 3/2011 | Douros et al. |
| 2011/0093433 A1 | 4/2011 | Stanfill et al. |
| 2011/0307897 A1 | 12/2011 | Atterbury et al. |
| 2012/0023508 A1 | 1/2012 | Flores et al. |
| 2012/0036498 A1 | 2/2012 | Akirekadu et al. |
| 2012/0054255 A1 | 3/2012 | Buxbaum |
| 2012/0102029 A1 | 4/2012 | Larson et al. |
| 2012/0151419 A1 | 6/2012 | Kent et al. |
| 2012/0216176 A1 | 8/2012 | Gaikwad et al. |
| 2012/0222017 A1 | 8/2012 | Hinkle |
| 2012/0233599 A1 | 9/2012 | Valdiviezo et al. |
| 2012/0266074 A1 | 10/2012 | Mukundan |
| 2013/0124392 A1 | 5/2013 | Achanta |
| 2013/0290928 A1 | 10/2013 | Johnson |
| 2014/0068566 A1 | 3/2014 | Coronado et al. |

FOREIGN PATENT DOCUMENTS

| | | |
|---|---|---|
| CN | 101702942 | 5/2010 |
| EP | 0834810 | 4/1998 |
| EP | 3287896 | 2/2018 |
| JP | 64-013189 | 1/1989 |
| JP | 06-236276 | 8/1994 |
| JP | H08-106540 | 4/1996 |
| JP | 08-278892 | 10/1996 |
| JP | 08-305576 | 11/1996 |
| JP | 63-231613 | 9/1998 |
| JP | 11-184766 | 7/1999 |
| JP | 2000-010788 | 1/2000 |
| JP | 2000-99317 | 4/2000 |
| JP | 2000-514219 | 10/2000 |
| JP | 2001-022571 | 1/2001 |
| JP | 2002-229943 | 8/2002 |
| JP | 2005-317010 | 11/2005 |
| JP | 2006-504160 | 2/2006 |
| JP | 2006-133986 | 5/2006 |
| WO | WO 98/00791 | 1/1998 |
| WO | WO 2002/011344 | 2/2002 |
| WO | WO 2005/001687 | 1/2005 |
| WO | WO 2005/086906 | 9/2005 |
| WO | WO 2008/124319 | 10/2008 |
| WO | WO 2009/039352 | 3/2009 |
| WO | 2014/011708 | 1/2014 |

OTHER PUBLICATIONS

"RASSP Data Flow Graph Design Application Note." International Conference on Parallel Processing, Dec. 2000, Retrieved from Internet <http://www.atl.external.lmco.com/projects/rassp/RASSP_legacy/appnotes/FLOW/APNOTE_FLOW_02>, 5 pages.

"System integration" Wikipedia, retrieved Jan. 25, 2009 (3 pages).

"Topological sorting," Wikipedia, accessed Dec. 10, 2012, 2 pages.

"Visual Lint: Squash Bugs Early with Interactive C/C++, C# and Java Code Analysis for Microsoft Visual Studio and Eclipse," [ retrieved from the internet Dec. 3, 2012: www.riverblade.co.uk/products/visual_lint.] (2 pages).

Babaoglu, O et al., "Mapping parallel computations onto distributed systems in Paralex" Compuero '91. Advanced Computer Technology, Reliable Systems and Applications. $5^{th}$ Annual European Computer Conference. Proceedings. Bologna, Italy May 13-16, 1991, Los Alamitos, CA, USA, IEEE Comput. Soc, US, May 13, 1991, pp. 123-130.

Baer, J.L. et al., "Legality and Other Properties of Graph Models of Computations." Journal of the Association for Computing Machinery, vol. 17, No. 3, Jul. 1970, pp. 543-554.

Bernstein and Newcomer, "Principles of Transaction Processing, $2^{nd}$ Edition", Morgan Kaufmann, XP002739946 (Jul. 24, 2009).

Bookstein, A. et al., "Modeling Word Occurrences for the Compression of Concordances." ACM Transactions on Information Systems, vol. 15, No. 3, Jul. 1997, pp. 254-290.

Burch, J.R. et al., "Sequential circuit verification using symbolic model checking." In Design Automation Conference, 1990, Proceedings of the $27^{th}$ ACM/IEEE. Jun. 24-28, 1990, pp. 46-51.

Canadian Office Action in Application No. 2,801,573, dated Apr. 13, 2016.

Chinese Office Action (English Translation) in Application No. 2010-80042716.8, dated Apr. 8, 2016 (14 pages).

Chinese Office Action issued in CN 201180039226.7, dated May 4, 2015.

Cytron, Ron et al., "Efficiently Computing Static Single Assignment Form and the Control Dependence Graph." ACM Transactions on Programming Languages and Systems, vol. 13, No. 4, Oct. 1991, pp. 451-490.

De Pauw et al., "Web Services Navigator: visualizing the execution of Web Services," XP2477231, ISSN: 0018-8670, Jan. 1, 2005.

Dillon, Laura K., et al., "Inference Graphs: A Computational Structure Supporting Generation of Customizable and Correct Analysis Components," IEEE Transactions on Software Engineering, vol. 29, No. 2, Feb. 2003, pp. 133-150.

Ebert, Jurgen et al., "A Declarative Approach to Graph-Based Modeling." Workshop on Graph-Theoretic Concepts in Computer Science, 1994, pp. 1-19.

European Examination Report in Application No. 10741775.0, dated Jan. 12, 2017.

European Examination Report issued in EP 06 785 623.7 dated Nov. 24, 2014, 5 pages.

European Examination Report issued in related EP Application No. 10 741 775.0 dated Jul. 7, 2014.

European Search Report issued in application No. EP10003554, dated Sep. 24, 2010, 7 pages.

European Search Report issued in application No. EP10741775, dated Nov. 14, 2012, 4 pages.

Evripidou, Paraskevas, et al., "Incorporating input/output operations into dynamic data-flow graphs," Parallel Computing 21 (1995) 1285-1311.

(56) References Cited

OTHER PUBLICATIONS

Examination Report in India Application 250CHENP2009, dated Aug. 31, 2016 (7 pages).
Extended European Search Report, EP 12165575, dated May 10, 2013, 9 pages.
Frankl, Phyllis G., et al., "An Applicable Family of Data Flow Testing Criteria," IEEE Transactions on Sofrware Engineering, vol. 14, No. 10, Oct. 1988, pp. 1483-1498.
Gamma et al. "Design Patterns: Elements of Reusable Object-Oriented Software", Sep. 1999.
Grove et al., "A Framework for Call Graph Construction Algorithms." Nov. 2001, ACM TOPLAS, vol. 23, Issue 6, pp. 685-746.
Guyer et al., "Finding Your Cronies: Static Analysis for Dynamic Object Colocation." Oct. 2004, ACM, pp. 237-250.
Herniter, Marc E., "Schematic Capture with MicroSim PSpice," 2$^{nd}$ Edition, Prentice Hall, Upper Saddle River, N.J., 1996, pp. 51-52, 255-280, 292-297.
IBM: "Concepts and Architecture—Version 3.6," Internet citation, publibfp.boulder.ibm.com.epubs/pdf/h1262857, retrieved Apr. 19, 2007.
International Search Report & Written Opinion issued in PCT application No. PCT/US01/23552, dated Jan. 24, 2002, 5 pages.
International Search Report & Written Opinion issued in PCT application No. PCT/US06/24957, dated Jan. 17, 2008, 14 pages.
International Search Report & Written Opinion issued in PCT application No. PCT/US07/75576, dated Sep. 16, 2008, 13 pages.
International Search Report & Written Opinion issued in PCT application No. PCT/US08/71206, dated Oct. 22, 2008, 12 pages.
International Search Report & Written Opinion issued in PCT application No. PCT/US10/49966, dated Nov. 23, 2010, 8 pages.
International Search Report & Written Opinion received in PCT application No. PCT/US2011/040440, dated Oct. 12, 2011, 13 pages.
International Search Report & Written Opinion received in PCT application No. PCT/US2013/070386, dated Feb. 12, 2014, 7 pages.
International Search Report & Written Opinion received in PCT application No. PCT/US2013/076416, dated Apr. 9, 2014, 10 pages.
International Search Report and Written Opinion, PCT/US2014/068754, dated May 8, 2015 (17 pages).
Japanese Office Action (English Translation) in application No. JP2014-077798, dated Nov. 11, 2015 (6 pages).
Japanese Office Action for Japanese Application No. 2010-518415, with English Translation, dated Nov. 18, 2013, 11 pages.
Japanese Office Action, with English Translation, JP application No. 2008-519474, dated Sep. 25, 2012, 8 pages.
Japanese Office Action, with English Translation, JP application No. 2009-523997, dated Oct. 23, 2012, 7 pages.
Japanese Office Action, with English Translation, JP application No. 2011-000948, dated Jan. 8, 2013, 11 pages.
Japanese Office Action, with English Translation, JP application No. 2010-518415, dated Feb. 21, 2013, 11 pages.
Jawadi, Ramamohanrao et al., "A Graph-based Transaction Model for Active Databases and its Parallel Implementation." U. Florida Tech. Rep TR94-0003, 1994, pp. 1-29.
Just et al., "Review and Analysis of Synthetic Diversity for Breaking Monocultures." Oct. 2004, ACM, pp. 23-32.
Karasawa, K.; Iwata, M.; and Terada, H.—"Direct generation of data-driven program for stream-oriented processing"—Published in: Parallel Architctures and Compilation Techniques., 1997. Proceedings., 1997 International Conference on; Nov. 10-14, 1997 San Francisco, CA—pp. 295-306.
Kebschull, U. et al., "Efficient Graph-Based Computation and Manipulation of Functional Decision Diagrams." University of Tubingen, 1993 IEEE, pp. 278-282.
Krahmer et al., "Graph-Based Generation of Referring Expressions." Mar. 2003, MIT Press, vol. 29, No. 1, pp. 53-72.
Krsul, Ivan et al., "VMPlants: Providing and Managing Virtual Machine Execution Environments for Grid Computing." Proceedings of the ACM/IEEE SC2004 Conference on Supercomputing, 2001, Nov. 6-12, 2004, 12 pages.
Li, Xiqing et al., "A Practical External Sort for Shared Disk MPPs." Proceedings of Supercomputing '93, 1993, 24 pages.
Martin, David et al., "Models of Computations and Systems—Evaluation of Vertex Probabilities in Graph Models of Computations." Journal of the Association for Computing Machinery, vol. 14, No. 2, Apr. 1967, pp. 281-299.
Mattson et al., "Patterns for Parallel Programming," Addison-Wesley Professional ISBN: 0-321-22811-1 (2004).
Ou, Chao-Wei et al., "Architecture-Independent Locality-Improving Transformations of Computational Graphs Embedded in κ-Dimensions." Proceedings of the 9$^{th}$ International Conference on Supercomputing, 1995, pp. 289-298.
Rajesh K. Gupta and Giovanni de Micheli—"A co-synthesis approach to embedded system design automation" Design Automation for Embedded Systems, vol. 1, issue 1-2, 69-120 (1996).
Russell, Nick, et al., "Workflow Control-Flow Patterns a Revised View," Workflow Patterns Initiative, 2006, pp. 1-134.
Shoten, Iwanami, "Encyclopedic Dictionary of Computer Science," (with English Translation), May 25, 1990, p. 741.
Stanfill, Craig et al., "Parallel Free-Text Search on the Connection Machine System." Communications of the ACM, vol. 29, No. 12, Dec. 1986, pp. 1229-1239.
Stanfill, Craig, "Massively Parallel Information Retrieval for Wide Area Information Servers." 1991 IEEE International Conference on Systems, Man and Cybernetics, Oct. 1991, pp. 679-682.
Stanfill, Craig, "The Marriage of Parallel Computing and Information Retrieval." IEE Colloquium on Parallel Techniques for Information Retrieval, Apr. 1989, 5 pages.
Supplemental European Search Report issued in application No. EP07813940, dated Nov. 26, 2009, 7 pages.
Supplemental European Search Report issued in application No. EP08796632, dated Sep. 24, 2010, 6 pages.
Supplemental European Search Report issued in application No. EP06774092, dated Dec. 19, 2012, 5 pages.
Supplemental European Search Report issued in EP 13 80 2160 dated Jul. 6, 2016 (6 pages).
Supplemental European Search Report issued in EP10819444, dated Jun. 3, 2015.
Transaction History, U.S. Appl. No. 09/627,252, Jul. 8, 2013, 2 pages.
Transaction Histoiy, U.S. Appl. No. 10/268,509, Jul. 8, 2013, 2 pages.
Transaction History, U.S. Appl. No. 11/167,902, Jul. 8, 2013, 3 pages.
Transaction History, U.S. Appl. No. 11/169,014, Jul. 8, 2013, 2 pages.
Transaction History, U.S. Appl. No. 11/467,724, Jul. 8, 2013, 2 pages.
Transaction History, U.S. Appl. No. 11/733,579, Jul. 8, 2013, 2 pages.
Transaction History, U.S. Appl. No. 11/836,349, Jul. 8, 2013, 4 pages.
Transaction History, U.S. Appl. No. 12/180,141, Jul. 8, 2013, 3 pages.
Transaction History, U.S. Appl. No. 12/638,588, Jul. 8, 2013, 3 pages.
Transaction History, U.S. Appl. No. 12/977,545, Jul. 8, 2013, 6 pages.
Transaction History, U.S. Appl. No. 13/161,010, Jul. 8, 2013, 2 pages.
Transaction History, U.S. Appl. No. 13/678,921, Jul. 8, 2013, 1 page.
Vajracharya, Suvas et al., "Asynchronous Resource Management." Proceedings of the 15$^{th}$ International Parallel and Distributed Processing Symposium, Apr. 2001, 10 pages.
Van der Aalst, W.M.P., et al., "Workflow Patterns," Distributed and Parallel Databases, 14, 5-51, 2003.
Wah, B.W. et al., "Report on Workshop on High Performance Computing and Communications for Grand Challenge Applications: Computer Vision, Speech and Natural Language Processing, and Artificial Intelligence." IEEE Transactions on Knowledge and Data Engineering, vol. 5, No. 1, Feb. 1993, 138-154.

(56) References Cited

OTHER PUBLICATIONS

Whiting, Paul G., et al., "A History of Data-Flow Languages," IEEE Annals of the History of Computing, vol. 16, No. 4, 1994, pp. 38-59.
Transaction History, U.S. Appl. No. 12/704,998, Jan. 11, 2018, 6 pages.
"Performance Measurement Supporting Increase in Processing Speed of Java Program/Load Testing Tool," Java World, IDG Japan, Inc., Apr. 1, 2005 vol. 9, No. 4, pp. 020-021 (partial English translation).

* cited by examiner

TASK MANAGING APPLICATION FOR PERFORMING TASKS BASED ON MESSAGES RECEIVED FROM A DATA PROCESSING APPLICATION INITIATED BY THE TASK MANAGING APPLICATION

CLAIM OF PRIORITY

This application is a continuation of U.S. application Ser. No. 12/704,998, filed on Feb. 12, 2010, which claims priority to U.S. application Ser. No. 61/152,669, filed on Feb. 13, 2009, the entire contents of each of which are incorporated herein by reference.

BACKGROUND

This description relates to managing task execution.

A data processing system typically stores, manages, processes, and analyzes data. A data processing system may simply handle one or more tasks scheduled to be completed at a certain time. Alternatively, a data processing system may be a large-scale customer relationship management system. Simple or complex, a data processing system often includes one or more components, such as processing elements, input data, and output data. The processing elements of a data processing system determine the function of the data processing system, for example, data warehouse, customer relationship management, and data mining, etc. Input data of a data processing system can come from many sources. For example, input data may come from flat files, database tables, operational systems, etc. Input data may also come from the Internet, carrying information from one system to another. Output data of a data processing system are what the processing elements generate. Formats of output data vary depending on the processing elements that generate them.

SUMMARY

In one aspect, in general, a method for managing task execution includes receiving a specification of a plurality of tasks to be performed by respective functional modules; processing a flow of input data using a dataflow graph that includes nodes representing data processing components connected by links representing flows of data between data processing components; in response to at least one flow of data provided by at least one data processing component, generating a flow of messages; and in response to each of the messages in the flow of messages, performing an iteration of a set of one or more tasks using one or more corresponding functional modules.

Aspects can include one or more of the following features.

At least one of the functional modules is configured to initiate execution of the dataflow graph.

The specification of the plurality of tasks specifies dependency relationships between the at least two of the tasks.

A dependency relationship between the at least two tasks defines at least a partial ordering for execution of the functional modules corresponding to the tasks.

A dependency relationship between the at least two tasks defines conditional logic for determine at least one condition upon which execution of at least one of the functional modules is based.

At least one of the functional modules includes a fault-handling module that is executed when the conditional logic detects that a fault has occurred in execution of one of the other functional modules.

Multiple iterations of a given set of one or more tasks are executed concurrently in response to two or more messages in the flow of messages.

One or more of the messages in the flow of messages is generated in response to an element of data in the flow of data without including the element of data.

One or more of the messages in the flow of messages includes at least a portion of an element of data in the flow of data.

At least one of the functional modules is configured to send an acknowledgement in response to receiving one of the messages in the flow of messages.

At least one of the data processing components resends an unacknowledged message.

The method further includes storing a parameter value identifying the specification of a plurality of tasks.

The method further includes transmitting the generated flow of messages to an application for receiving the messages identified by the parameter value.

The method further includes storing messages received by the application in parameters visible to multiple processes for performing the tasks.

In another aspect, in general, a system for managing task execution includes: a task managing system including circuitry for receiving a specification of a plurality of tasks to be performed by respective functional modules; and a data processing system including circuitry for processing a flow of input data using a dataflow graph that includes nodes representing data processing components connected by links representing flows of data between data processing components. The data processing system is configured to generate a flow of messages in response to at least one flow of data provided by at least one data processing component. The task managing system is configured to perform an iteration of a set of one or more tasks using one or more corresponding functional modules in response to each of the messages in the flow of messages.

In another aspect, in general, a system for managing task execution includes: means for receiving a specification of a plurality of tasks to be performed by respective functional modules; and means for processing a flow of input data using a dataflow graph that includes nodes representing data processing components connected by links representing flows of data between data processing components. The data processing to system is configured to generate a flow of messages in response to at least one flow of data provided by at least one data processing component. The task managing system is configured to perform an iteration of a set of one or more tasks using one or more corresponding functional modules in response to each of the messages in the flow of messages.

In another aspect, in general, a computer-readable medium stores a computer program for managing task execution. The computer program includes instructions for causing a computer to: receive a specification of a plurality of tasks to be performed by respective functional modules; process a flow of input data using a dataflow graph that includes nodes representing data processing components connected by links representing flows of data between data processing components; in response to at least one flow of data provided by at least one data processing component, generate a flow of messages; and in response to each of the messages in the flow of messages, perform an iteration of a set of one or more tasks using one or more corresponding functional modules.

Aspects can include one or more of the following advantages.

The techniques enable data flow to be converted into control flow and can facilitate data processing situations where incoming data are continuous and unpredictable and each piece of data may need elaborate handling.

Dataflow graphs can be incorporated into the control flow of a task managing application, allowing different dataflow graphs for data processing based on the values stored in the incoming message generated in response to elements of a data flow.

Having separate development environments for data processing and task management allows development of data processing applications and task managing applications to be sandboxed into independent environments that do not interfere with each other.

Since data processing applications often emphasize data availability, data transformation, and data integrity, and task managing applications often emphasize error handling, system resource allocation, and computation order, using separate graphical development tools in a complex data processing system for developing data processing applications and task managing applications allow each tool to meet the unique requirements of each type of the applications.

Having a separate data processing application and task managing application also facilitates software reuse.

In a complex data processing system, data may come from diverse external sources and take on different formats. Incoming data may be corrupted and error checking may be used to ensure data integrity. A separate data processing application that handles reformatting and error checking encapsulates and isolates this complexity from a downstream task managing application, allowing task managing application to be developed without specific knowledge of possible data sources and to be reused when data sources or formats are changed. Likewise data processing applications can be developed with a focus on the data sources and without specific knowledge of the downstream computation environment and can be reused even when downstream handling has been changed.

Other features and advantages of the invention will become apparent from the following description, and from the claims.

DETAILED DESCRIPTIONS

Figure 1A:
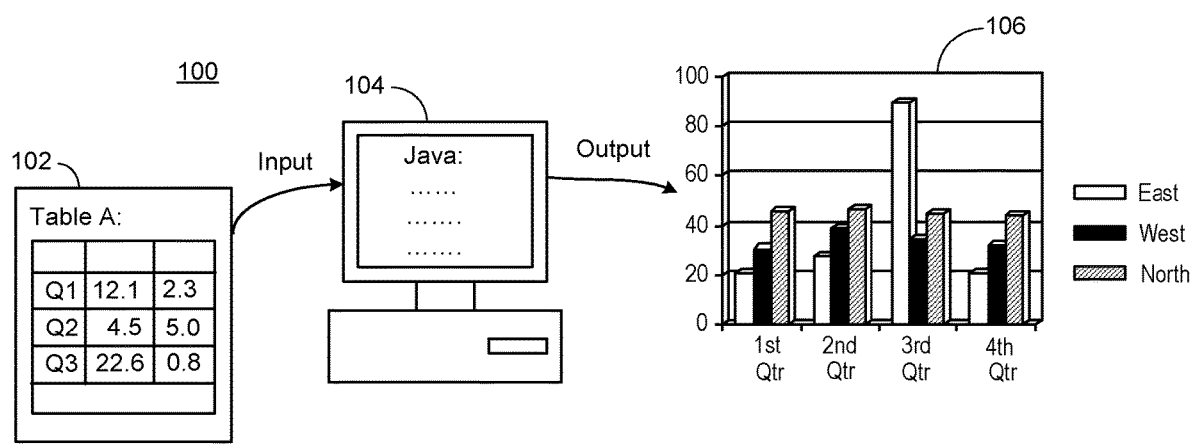
FIGS. 1A and 1B show examples of data processing systems.
Figure 1B:
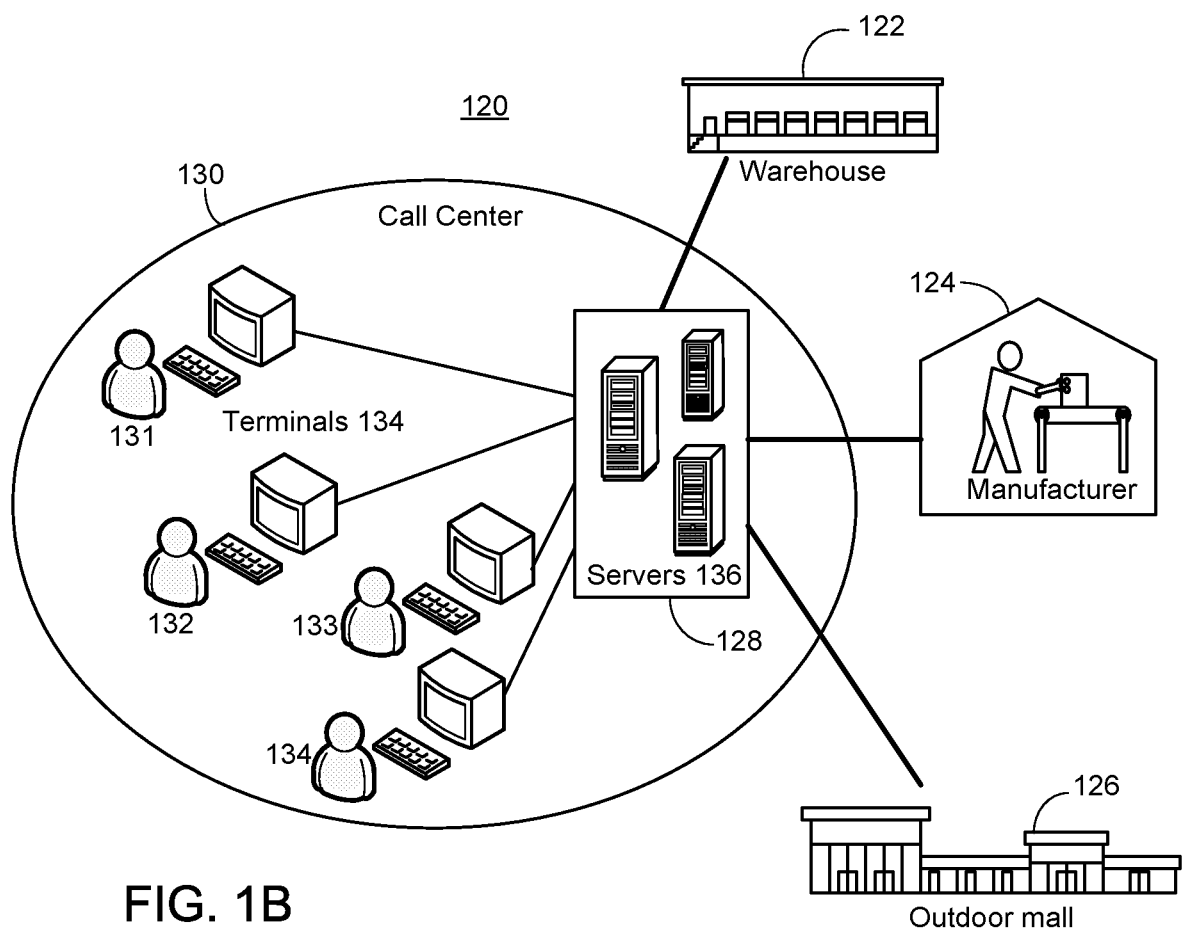

FIGS. 1A and 1B show examples of data processing systems. The data processing system 100 in FIG. 1A is a chart generation tool. In FIG. 1A, a Java program 104 reads input from a table 102 that contains sales data, then plots a bar chart 106 as output. The Java program 104 is a processing element of the data processing system 100; the table 102 is the input data; and the bar chart 106 is the output data.

The data processing system 120 in FIG. 1B includes a call center 130 deployed in a retail business. The call center 130 pulls data from a warehouse 122, a manufacturer 124, a retail 4e 126, and terminals 134 to give call center agents 131, 132, 133, and 134 real-time information regarding merchandise availability. Servers 136, the terminals 134, and the applications running on them are the processing elements. Information pulled from the warehouse 122, the manufacturer 124, the retail store 126, and the terminals 134 is input data. Real-time information regarding merchandise availability that is displayed on the call agents' terminals is output data.

A complex data processing system, such as the one shown in FIG. 1B, handles volumes of data and performs myriads of computations through applications that run on the system. Some applications are commercially available. Some applications have to be customer tailored to meet customers' special demands.

Applications in a complex data processing system tend to specialize. For example, some applications may mainly handle data processing and some may mainly handle task managing. Data processing applications usually handle data-related computations, such as reformatting, sorting, and organizing data. Data processing applications tend to have a focus on how data flow from a source to a destination and how data are transformed in the process. Task managing applications usually handle scheduling and initiating execution of computation-related jobs, such as executing programs, scheduling events, managing processes, and dealing with faulty conditions. Task managing applications tend to have an emphasis on how control flows from task to task and how control flow is affected by conditional logic and faulty conditions.

Data processing applications and task managing applications typically have different characteristics. Development environments for these two types of applications may be the same or separate. An exemplary development environment for a data processing application is a graph-based computation environment described below.

A graph-based computation environment allows a programmer to build a graph-based application by using components as building blocks. A graph-based application is often represented by a directed graph, with nodes (or "vertices") in the graph representing components (either data storage components or executable computation components), and the directed links (or "edges") in the graph representing flows of data between components. A dataflow graph (also called simply a "graph") is a modular entity. Each graph can be made up of one or more other graphs, and a particular graph can be a component in a larger graph. A graphical development environment (GDE) provides a user interface for developers to develop, test, and deploy applications as executable graphs that are tailored to a given user-specific environment.

Figure 2:
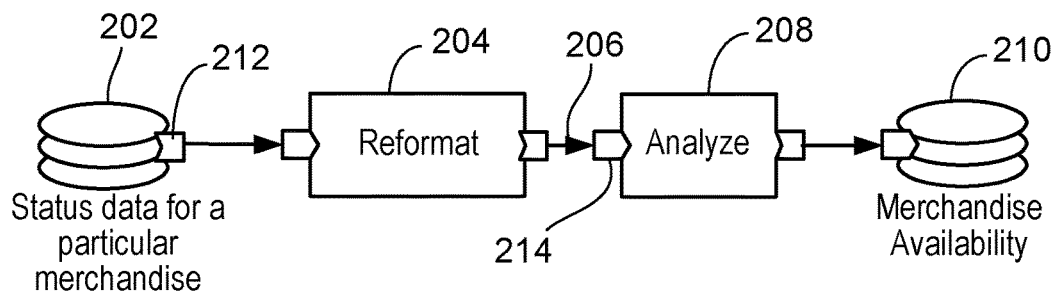
FIG. 2 is an example of a dataflow graph.

FIG. 2 is an example of a dataflow graph that represents a data processing application. In FIG. 2, input dataset component 202 contains status data for a particular merchandise. The status data are pulled from warehouses, manufacturers, and retail stores. A computation component 204 reads the data contained in the input dataset component 202, reformats them, and feeds them to a next computation component 208. The computation component 208 analyzes the reformatted data and generates output data to be stored in output dataset component 210. The output data represent merchandise availability. Symbol 212 is an output port representing a source of data elements (e.g., records or other units of data) flowing out of the input dataset component 202. Symbol 214 is an input port representing a destination for data elements flowing into the computation component 208. Link 206 shows the direction in which the data flows, i.e., from the computation component 204 to the computation component 208. The data processing application embodied by the dataflow graph 200 can be used in a call center system, such as the call center system 120 shown in FIG. 1B.

A dataflow graph, such as graph 200, embodies the data processing aspects of a data processing application such as, for example, where the data come from, what transformations the data undergo, and where the data arrive.

Figure 3:
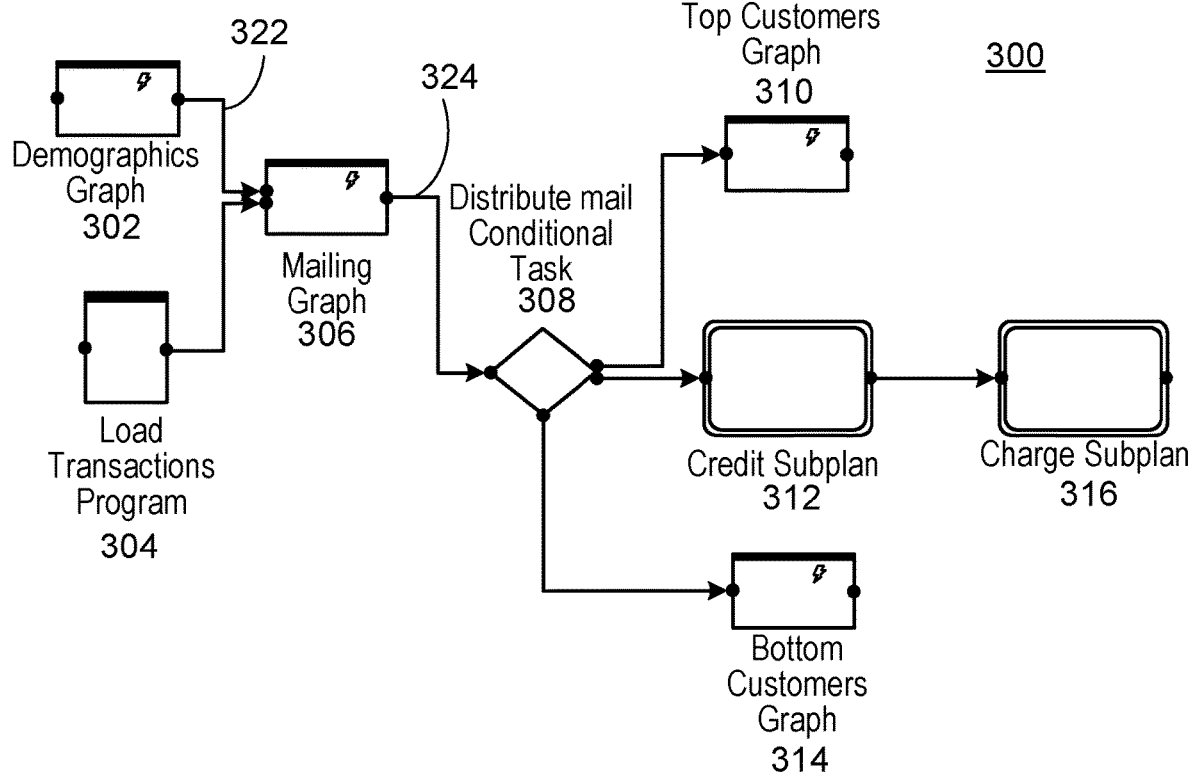
FIG. 3 is an example of a control flow diagram.

As a comparison, FIG. 3 shows a control flow diagram 300 (also called a "Plan"). The control flow diagram 300 represents a specification for a task managing application which specifies tasks to be performed by respective functional modules. A functional module may perform a task that includes, for example, a series of actions to be executed on a computer system. A functional module may be implemented using a dataflow graph or may represent another control flow diagram (called a "SubPlan"). A functional module may be an implementation of conditional logic, or a program, or a user script. In the control flow diagram 300, functional modules, such as Demographics Graph 302, Mailing Graph 306, Top Customers Graph 310, and Bottom Customers Graph 314, are dataflow graphs.

Load Transactions Program 304 is a functional module that includes executable code e.g., a script in Python or Perl. Distribute Mail Conditional Task 308 is an implementation of conditional logic, directing the control to either a Top Customers Graph 310, or a Credit SubPlan 312, or a Bottom Customers Graph 314 depending on whether a particular customer is classified as a top customer or a bottom customer or a customer who needs credit extension. Credit SubPlan 312 and Charge SubPlan 316 are themselves control flow diagrams. The functional modules are connected with arrow links, 322, 324, etc. The arrow links specify dependency relationships among the tasks performed by the functional modules and thus indicate how control flows from one functional module to another and define at least a partial ordering according to which the functional modules run. For example, Demographic Graph 302 is run before Mailing Graph 306.

A control flow diagram, such as diagram 300, embodies the control aspects of the task managing application controlled by the control flow diagram. Control aspects of a task managing application include, for example, determining running sequences among different tasks and applying conditional logic.

As mentioned above, a complex data processing system may need to manage large volumes of data as well as perform numerous computations. In a complex data processing system, both task managing applications and data processing applications may be used.

For example, in the call center system 120 shown in FIG. 1B, customer transaction data stream into the system and are processed using real-time processing. If only a one-step processing is required to handle the data, such as registering the data as an entry in a database, a simple application represented by a dataflow graph such as the dataflow graph 200 may be sufficient. However, in many cases, multi-step processing may be needed. For example, in a large retail business, thousands of customer transactions may happen simultaneously. Parallel processing may be needed. Or in a sophisticated retail business, customers may be accorded differential treatments. Therefore conditional logic may be implemented to handle different classes of customers. Or in a reliable call center system, exception handling, failover, and data clean-up may be used. Thus, fault handling may be required.

When data processing is a multi-step process that involves parallel processing, conditional logic, and/or fault handling, a simple dataflow graph may not be the best approach to capture the complexity of the multi-step process. It may be advantageous to convert data flow to control flow at a certain stage during the process.

For example, a complex data processing system, such as the call center system 120 shown in FIG. 1B, may use both data processing applications and task managing applications. Incoming data are first processed in a data processing application. The data is then used to drive the control flow in a task managing application. For a developer who develops applications for a complex data processing system, the technique of letting the data flow drive the control flow can be used, for example, when incoming data are streaming, continuous, and unpredictable, or when concurrent data processing may be needed. An example of this technique is illustrated in FIG. 4.

Figure 4:
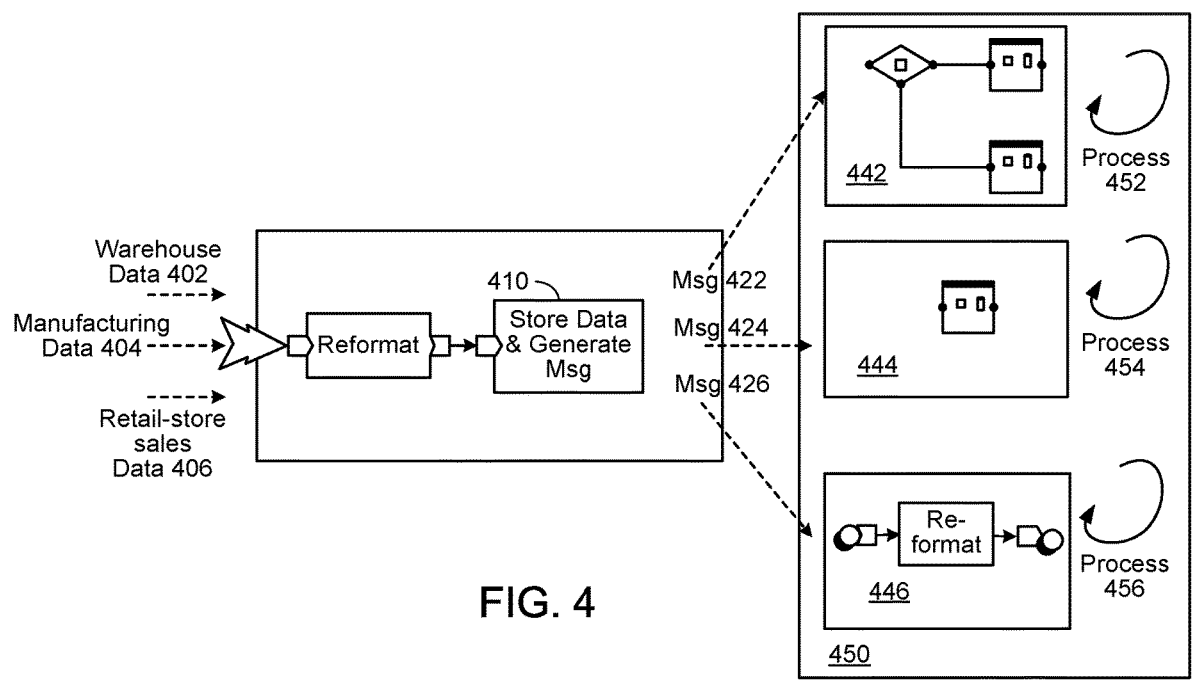
FIG. 4 illustrates how to convert data flow to control flow.

In FIG. 4, a data processing application (such as the call center system 120 shown in FIG. 1B) receives a flow of input data, such as warehouse data 402, manufacturing data 404, and retail-store sales data 406, from various external sources. As the input data stream into the data processing application, implemented in this example by the dataflow graph 410, a component in the graph 410 reformats the data coming from different sources into an appropriate format. Another component in the graph 410 then stores the data and generates messages to be sent to the task managing application 450. Messages generated by the data processing application are based on the received incoming data or an element in the received incoming data, and in some implementations portions of the incoming data can be used as the messages.

Different mechanisms can be used to transmit a message from the data processing application 410 to the task managing application 450, for example, message passing, queues, shared memory space, remote procedure calls. The task managing application 450, based on the messages or certain values contained in the messages, can invoke different processes, such as a process executing a Plan 442, a SubPlan 444, and/or a dataflow graph 446.

In some cases the task managing application 450 invokes a separate iteration of a corresponding set of one or more tasks (e.g., Plan 442, SubPlan 444, or dataflow graph 446) for each incoming message received from the data processing application 410. So if each message is generated in response to an element of data generated as output of the data processing application 410, the application 450 is able to iterate for each element of data. A loop index increments for each iteration of the task managing application 450. In each loop iteration, a process associated with the current loop index is spun off to handle an incoming message. Depending on the message received by the task managing application 450 or a value contained in the message, the process spun off to handle an incoming message can execute a dataflow graph, or a SubPlan, or any program for performing a set of one or more tasks.

In the illustrated example, for the first element of incoming warehouse data 402 processed by the data processing application 410, a message 422 is generated by the data processing application 410 and transmitted to the task managing application 450. The task managing application 450 being in its first loop iteration (with loop index 0), spins off a child process 452 to handle the message 442. The process 452 corresponds to the Plan 442, evoked by the task managing application 450 to reduce the number of merchandise available. A child process 454 is initiated in a second loop iteration associated with loop index 1 of the task managing application 450 to handle the second element of incoming data, generated in response to the manufacturing data 404. The child process 454 may correspond to the SubPlan 444, which, for example, performs the task of increasing the number of merchandise available. A child process 456 is initiated in a third loop iteration associated with loop index 2 to handle the third element of incoming data, generated in response to the retail store sales data 406. The child process 456 may correspond to executing the dataflow graph 446. The task managing application may be configured to invoke the processes, 452, 454, and 456, concurrently or serially.

Processes may refer to processes that run on different CPUs or on the same CPU. In the latter case, the processes may also be known as "threads".

For increased reliability, the task managing application 450 may be configured to send an acknowledgement to the data processing application 410 when it receives a message. The acknowledgement can be a positive acknowledgement if the task managing application decides that the message received is intact or a negative one if the task managing application decides that the message received is corrupted.

The data processing application 410 can be configured to wait for an acknowledgement that the last-sent message has been received before sending the next message. It can be further configured to send the next message upon receiving a positive acknowledgement and re-send the last message upon receiving a negative acknowledgement.

Figure 5:
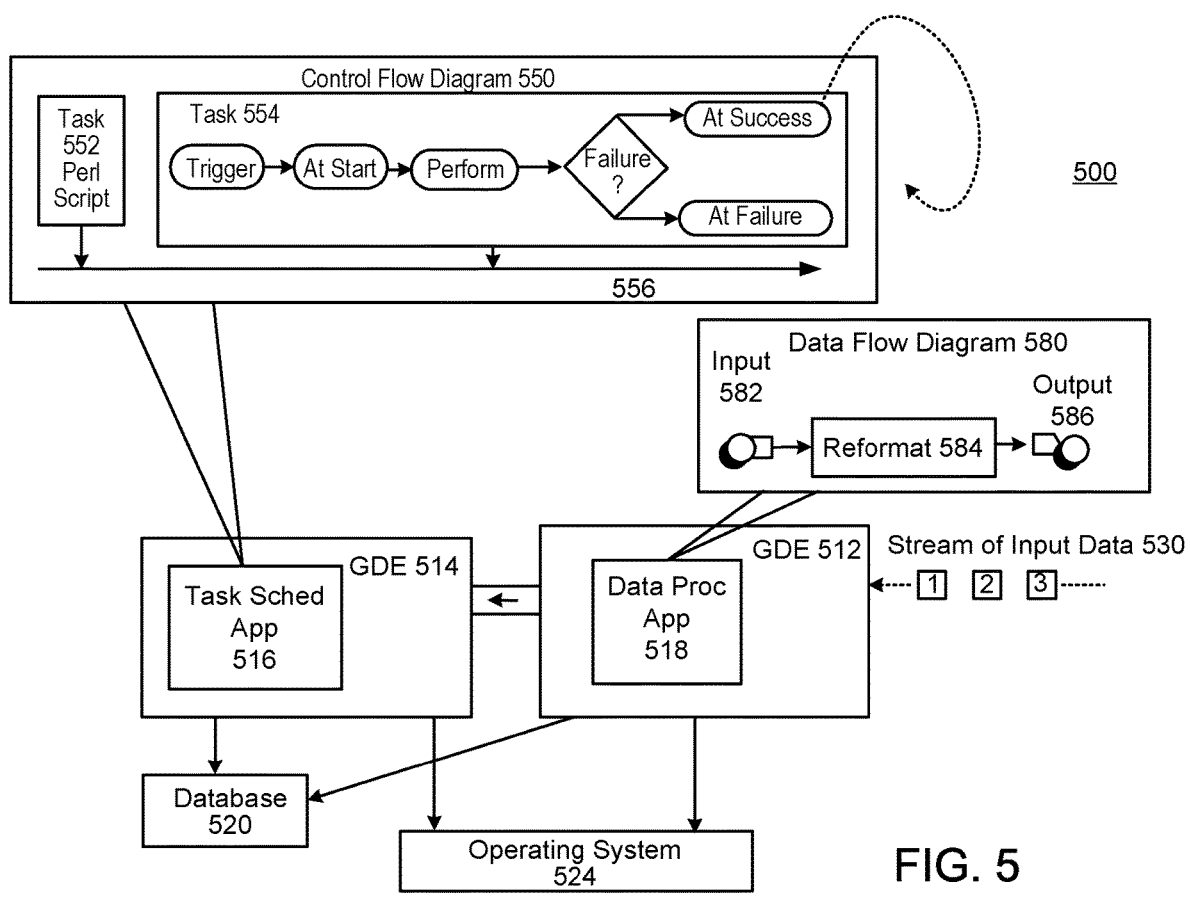
FIG. 5 is a block diagram of a data processing system.

FIG. 5 is a block diagram of an application development and execution system 500. The system 500 includes two graphical development environments, a GDE 512 used for dataflow graph development and a GDE 514 used for control flow diagram development. Alternatively, one graphical development environment can be used for development of both dataflow graphs and control flow diagrams. Or a graphical development environment can be used for developing control flow diagrams and a command line user interface can be used for dataflow graphs, or vice versa. Using the GDE 512, a data processing application 518 is built that includes a dataflow graph 580. Using the GDE 514, a task managing application 516 is built that includes a control flow diagram 550.

The system 500 also includes a database 520. The database 520 may be a scalable object-oriented database system that provides storage for various kinds of information (e.g., metadata) for the system 500. The database 520 may be, for example, an enterprise metadata database, which can support the development and execution of graph-based applications and the interchange of data between the graph-based applications and other systems, e.g., operating systems.

The system 500 further includes an operating system 524. The operating system 524 may be, for example, a parallel operating environment. The operating system 524 provides support for running application development environments, such as GDE 512 and GDE 514, and provides for scalable parallel and distributed execution of the applications developed.

In FIG. 5, a stream of input data 530 go through the dataflow graph 580 as the data are being processed by the data processing application 518. The dataflow graph 580 includes a computation component, reformat 584. In the dataflow graph 580, the data flow from input dataset 582 to output dataset 586.

After being reformatted, the data flow out of the data processing application 518 and into the task managing application 516, and are used to drive the task managing application 516 driven by the control flow diagram 550. The control flow diagram 550 shows two tasks, task 552 and task 554. A task may be a computation performed, for example, by executing a dataflow graph or a script, such as a Perl script. A time sequence 556 shows the running sequence of the tasks specified in the control flow diagram 550. In this case, the task 552 is executed before the task 554.

As shown in FIG. 5, the task 552 in the control flow diagram 550 is a Perl script and the task 554 in the control flow diagram is itself a control flow diagram of sub-tasks. The task 554 includes several sub-tasks implemented by methods that can be executed in the operating system 524. These methods may be existing methods provided by the system or customized methods developed by users. As shown in FIG. 5 as an example, the task 554 includes five methods: Trigger, At Start, Perform, At Failure, and At Success. These methods may be provided by the system or may be developed by a customer.

In some examples, the above five methods may be implemented as follows.

Method Trigger may be implemented to represent the starting point of the task 554. It may contain the condition for starting the execution. The condition may be whether a specific file exists, or whether a flag has been set to true.

Method At Start may be implemented as a method that prepares the system for the method Perform, such as setting environmental variables to desired values, or setting up log files to log runtime information.

Method Perform may be implemented to perform the main functionality of the task 554. Task 554 may also contain conditional logic to handle what happens after method Perform. If method Perform succeeds during its execution, method At Success is executed to exit task 554 with a return code of zero. If method Perform fails during its execution, method At Failure is executed to exit task 554 with a return code of non-zero. Optionally, additional methods can be added for rollback, error handling, and recovery. For example, a method of rollback can be added to roll back what has been done in reverse execution order starting at the point of failure. Alternatively. a method of cleanup can be added to clean up the failed conditions, by resetting flags, registers, etc.

Figure 6:
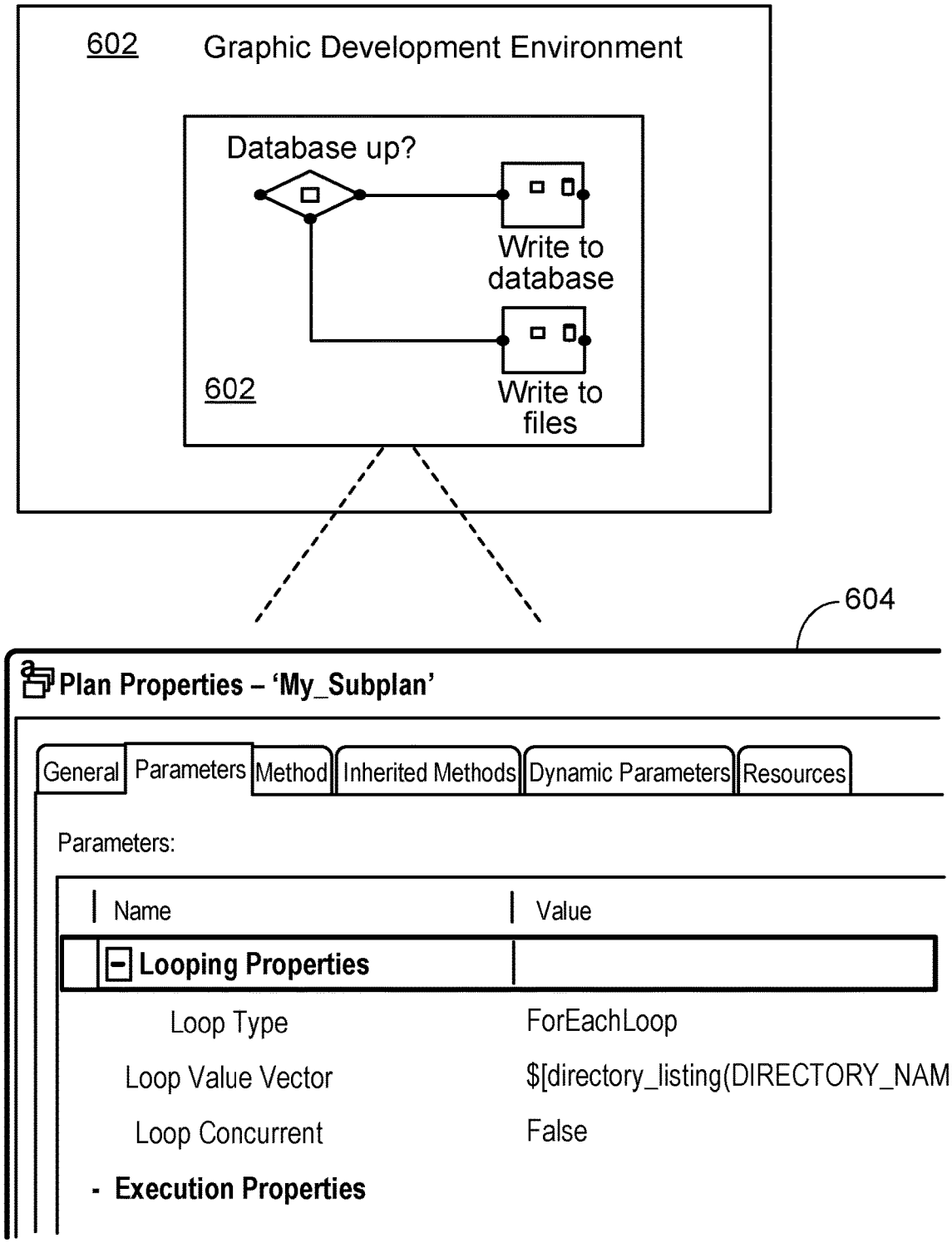
FIG. 6 is an example showing how to configure an application to run iteratively.

To handle iterative incoming data, a looping SubPlan can be used. In some implementations, a task managing application is configured to include a looping SubPlan. As shown in FIG. 6, the control flow diagram 602 is an example of a looping SubPlan and has conditional logic implemented for handling an element of incoming data. To handle a stream of incoming data, the control flow diagram 602 is run iteratively. The screen shot 604 is an example showing how to configure a simple application, called "My_Subplan" in this example, as a looping SubPlan by setting a predetermined property to "looping" and by setting appropriate looping properties. Looping properties include loop type (Do-While, For-Each, etc.), loop value vector, loop concurrent, loop count and loop indices, etc.

Figure 7A:
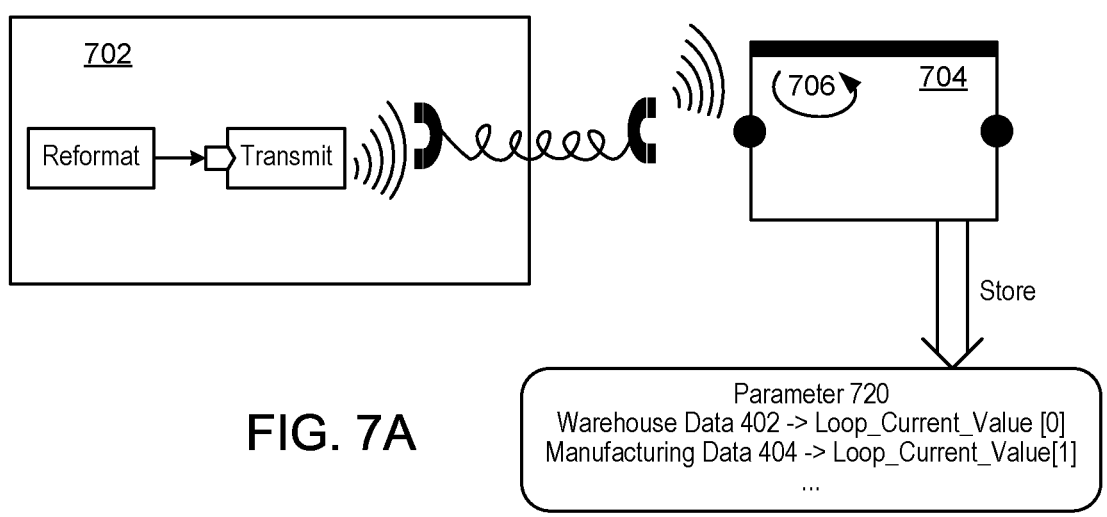
FIGS. 7A and 7B are block diagrams showing implementations of iterative task handling.
Figure 7B:
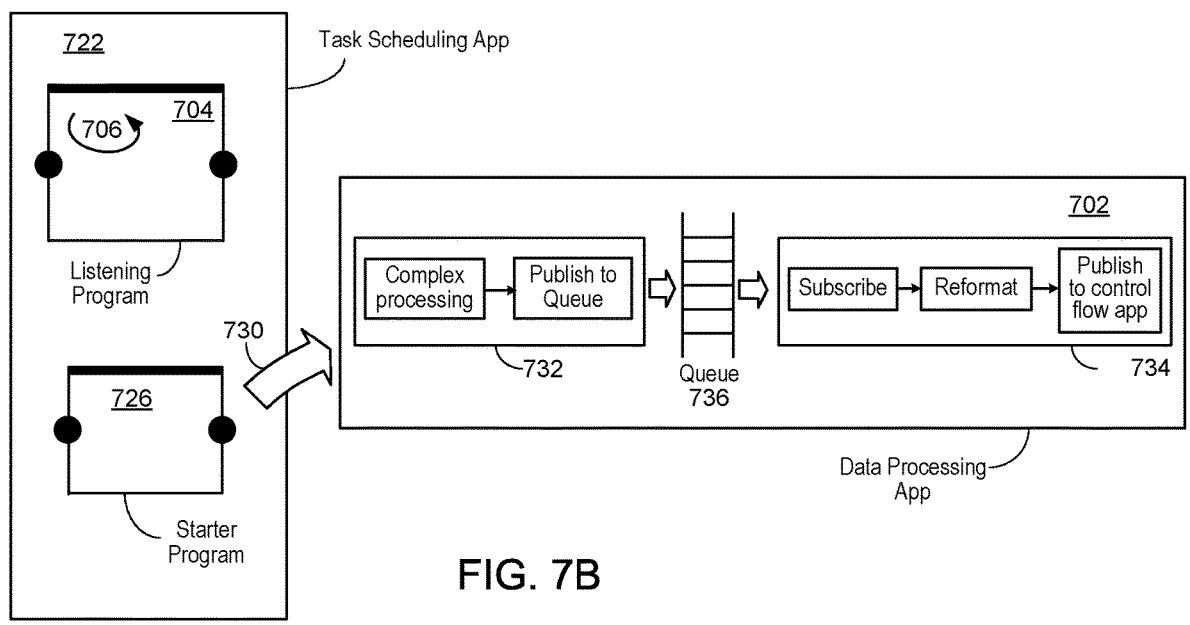

FIGS. 7a and 7b demonstrate, as an example, how to construct a system that includes a task managing application and a data processing application to handle iterative incoming data.

Suppose that we have a business that involves processing customer transactions that arrive continuously and unpredictably. A developer can construct a data processing application 702 to handle data formatting and other preparation work, and a task managing application 704 to perform tasks to further process the data. After the data processing application and the task managing application have been constructed, the data processing application can be configured to pass data to the task managing application and the task managing application can be configured to listen for messages that are coming from the data processing application. In some implementations, messages passed between the data processing application and the task managing application may include data output by the data processing application (e.g., encapsulated and/or encrypted in messages). In some implementations, messages passed between the data processing application and the task managing application can be generated in response to data from the data processing application without including the output data itself. Thus, the term "message" can refer to information passed between the data processing application and the task managing application in any form or format.

On the task managing side, the task managing application 704 includes a looping set of one or more tasks (e.g., a SubPlan) that listens continuously for messages from the data processing application 702. Symbol 706 is a symbol indicating that the application is running iteratively. A message arriving for the task managing application 704 triggers a new loop iteration in which a process can be spun off. The task managing application 704 can be configured to wait until the last loop iteration finishes before starting a new loop iteration or to start a new iteration immediately upon the receipt of a message. In the latter case, processes spun out of each iteration run concurrently.

On the data processing side, a user can configure a message-transmitting application (e.g., a dataflow graph) to "talk" to a counterpart listening application, which in this case is the task managing application 704. In some implementations, the message-transmitting application defines a parameter that holds the name of the counterpart listening application so the message-transmitting application knows where to send messages.

As mentioned before, having a separate data processing application and task managing application provides the advantage of software re-use. However when the task managing application, i.e., the counterpart listening application, has been replaced by a new task managing application, the parameter in the message transmitting application that holds the name of the counterpart listening application needs to be updated correspondingly. A user may need to open the message-transmitting application and make the required change.

To avoid the need of opening the message transmitting application every time the task managing application has been replaced by a new application, parameter Name_of_Listening_Application can be made visible to both the message transmitting application and any counterpart listening application. In the listening application, parameter Name_of_Listening_Application is assigned the value of the listening application's name. Because the parameter is also visible to the message transmitting application, the message transmitting application can read the value of parameter Name_of_Listening_Application to find out the application to which it is supposed to send message. In this way, the listening application can be changed even at run time without any need of opening the message transmitting application for updates.

In some implementations, the listening application stores the received messages in parameters. A parameter of a process defines a system setting for that process. In some cases, a parameter of a parent process can be inherited by and therefore visible to its child processes. For example, parameter 720 in FIG. 7*a* are used to store messages transmitted from data processing application 702 to task managing application 704.

Optionally, the user can construct a program or a method on the task managing side to kick off the message-transmitting application, as shown in FIG. 7*b*. In FIG. 7*b*, the task managing application 722 (a Plan) includes a listening program 704, which is a task managing application itself (a SubPlan), that listens for messages, and a starter program 726 that initiates execution of the message-transmitting data processing application 702, as shown by an arrow 730.

FIG. 7*b* also shows that the data processing application 702 includes two data processing applications, 732 and 734, and a queue 736. The data processing application 732 first performs complex processing on incoming data. Then it hands the data over so that the data get published to the queue 736. From the queue 736, the data processing application 734 retrieves the data, reformats them, and publishes them to the task managing application 704 by sending a message to be stored in a predetermined location. Here the queue 736 is acting as a buffer between the incoming data streaming into the data processing application 732 and the outgoing data streaming out of the data processing application 734. In this way, the data processing application 734 may be configured to wait for an acknowledgement of the previously sent message before sending out the next message without blocking the data processing application 732 from processing incoming data that are streaming in continuously and unpredictably. Also the data processing application 734 is kept simple and lightweight because part of the complex processing is removed from it.

When the task managing application 722 starts running, the starter program 726 initiates the data processing applications 732 and 734. In the meantime, the listening program 704 begins listening for messages from the message-transmitting data processing application 702. In some implementations, the data processing applications 732 and 734 and the task managing application 722 may be configured to run on the same host. The data processing applications 732 and 734 and the task managing application 722 may also include various error-handling methods, such as rollback, recovery, clean-up, and acknowledgements and message tracking that are used to make message transmitting resilient to failures, as demonstrated in FIG. 8.

Figure 8:
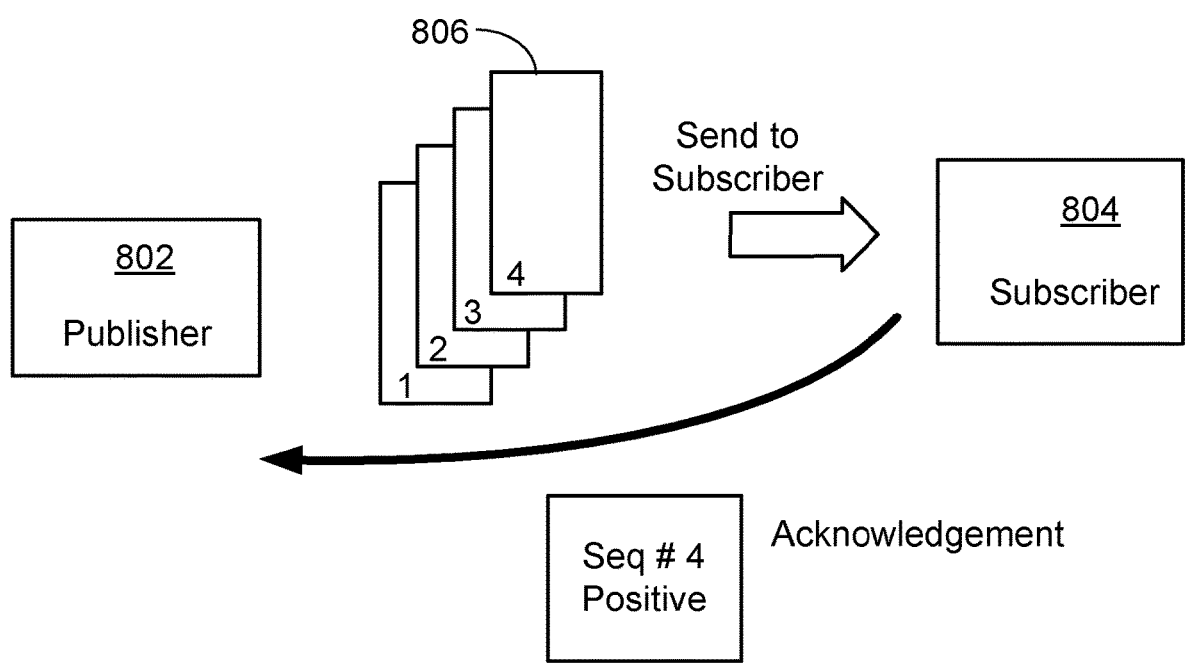
FIG. 8 is an example of a data transmitting mechanism.

In FIG. 8, the message-transmitting application 802, labeled as publisher, may be the data processing application 702 as shown in FIG. 7*a* or the data processing application 734 as shown in FIG. 7*b*. The receiving application 804, labeled as subscriber, may be the task managing application 704 as shown in FIG. 7*a* or 7*b*.

In FIG. 8, messages sent from the publisher are assigned a sequence number. Sequence numbers help the publisher to keep track of the messages sent and facilitate acknowledgements of receipt of the messages by the subscriber. For each message received, the subscriber sends an acknowledgement to the publisher. In the acknowledgement, the subscriber indicates the sequence number of the received message and whether the message is intact (positive) or corrupted (negative).

When the publisher sends a message with a sequence number X, it may wait for an acknowledgement for the message. When it receives the acknowledgement that contains the sequence number X, it sends the next message of a sequence number X+1 if the acknowledgement is positive or resends the message of the sequence number X if the acknowledgement is negative.

Alternatively, the publisher may send messages without waiting for acknowledgements of previously sent messages. The publisher may store unacknowledged messages and resend the messages if no acknowledgement has been received within a certain period of time. The subscriber can be programmed to ignore messages with the same sequence number so that receiving a repeated message will not cause a problem.

If the system were to crash at some point, the publisher can resend the unacknowledged messages on recovery. The unacknowledged messages can be stored in a persistent storage, such as a disk, if it is desired that the data survive system failures.

Other methods or techniques can be used to ensure that each message is transmitted successfully.

The approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A computer-implemented method for managing task execution in a data processing system by inputting data flow into a data processing application, the method including:
   receiving, by a task managing application executing in the data processing system, a specification of a plurality of tasks, wherein the task managing application includes a first program and a second program;
   initiating, by the first program of the task managing application, execution by the data processing system of the data processing application;
   processing, by the data processing application of the data processing system, a data flow input into the data processing application;
   generating, by the data processing application, a message including data elements, with at least one of the data elements including data based on processing of the data flow;
   transmitting the message to the task managing application;
   intermittently receiving messages by the second program that listens for messages sent from the data processing application;
   storing by the second program the received messages in data structures; and
   for each message stored in a given one of the data structures,
      starting, by the second program of the task managing application, a new iteration of the plurality of tasks in the specification;
      identifying, by the second program of the task managing application, at least one of the tasks to perform based on one or more values of the data elements in the message stored in the given one of the data structures; and
      performing, by the task managing application, the identified at least one of the tasks.

2. The method of claim 1, wherein the plurality of tasks are to be performed by respective functional modules.

3. The method of claim 1, wherein a dependency relationship between at least two tasks of the tasks defines at least a partial ordering for execution of functional modules corresponding to the tasks.

4. The method of claim 1, wherein the plurality of tasks are to be performed by respective functional modules, wherein a dependency relationship between at least two tasks of the tasks defines conditional logic for determining at least one condition upon which execution of at least one of the functional modules is based.

5. The method of claim 4, wherein at least one of the functional modules includes a fault-handling module that is executed when the conditional logic detects that a fault has occurred in execution of one of the other functional modules.

6. The method of claim 4, wherein the generated message comprises a first message, and wherein second tasks are executed concurrently with the identified at least one of the tasks, with execution of the second tasks being in response to generating a second message.

7. The method of claim 1, wherein the plurality of tasks are to be performed by respective functional modules, wherein at least one of the functional modules is configured to send an acknowledgement in response to receiving the message.

8. The method of claim 1, wherein a data processing component resends an unacknowledged message.

9. The method of claim 1, wherein the specification includes a control flow diagram that includes nodes representing functional modules, with the nodes connected by directed links representing flow of control between functional modules.

10. The method of claim 1, wherein control flows from a first functional module to a second functional module, with a directed link connected from the first functional module to the second functional module, after a task performed by the first functional module has been completed.

11. The computer-implemented method of claim 1, further including listening, from time to time, for the messages.

12. The computer-implemented method of claim 1, wherein storing the messages received comprises storing a first message received at a first time in a first data structure and storing a second message received at a second time in a second data structure.

13. The computer-implemented method of claim 1, wherein the first program includes code and wherein the second program accesses or includes at least a portion of the code.

14. A data processing system for managing task execution in the data processing system by inputting data flow into a data processing application, the system including:
one or more processing devices; and
one or more machine-readable hardware storage devices storing instructions that are executable to cause the one or more processing devices to perform operations including:
receiving, by a task managing application executing in the data processing system, a specification of a plurality of tasks, wherein the task managing application includes a first program and a second program;
initiating, by the first program of the task managing application, execution by the data processing system of the data processing application;
processing, by the data processing application of the data processing system, a data flow input into the data processing application;
generating, by the data processing application, a message including data elements, with at least one of the data elements including data based on processing of the data flow;
transmitting the message to the task managing application;
intermittently receiving messages by the second program that listens for messages sent from the data processing application;
storing by the second program the received messages in data structures; and
for each message stored in a given one of the data structures,
starting, by the second program of the task managing application, a new iteration of the plurality of tasks in the specification;
identifying, by the second program of the task managing application, at least one of the tasks to perform based on one or more values of the data elements in the message stored in the given one of the data structures; and
performing, by the task managing application, the identified at least one of the tasks.

15. The system of claim 14, wherein a dependency relationship between at least two tasks of the tasks defines at least a partial ordering for execution of functional modules corresponding to the tasks.

16. The system of claim 14, wherein the plurality of tasks are to be performed by respective functional modules, wherein a dependency relationship between at least two tasks of the tasks defines conditional logic for determining at least one condition upon which execution of at least one of the functional modules is based.

17. The system of claim 14, wherein the first program includes code and wherein the second program accesses or includes at least a portion of the code.

18. A data processing system for managing task execution in the data processing system by inputting data flow into a data processing application, the data processing system including:
means for receiving, by a task managing application executing in the data processing system, a specification of a plurality of tasks, wherein the task managing application includes a first program and a second program;
means for initiating, by the first program of the task managing application, execution by the data processing system of the data processing application;
means for processing, by the data processing application of the data processing system, a data flow input into the data processing application;
means for generating, by the data processing application, a message including data elements, with at least one of the data elements including data based on processing of the data flow;
means for transmitting the message to the task managing application;
means for intermittently receiving messages by the second program that listens for messages sent from the data processing application;
means for storing by the second program the received messages in data structures; and
for each message stored in a given one of the data structures,
means for starting, by the second program of the task managing application, a new iteration of the plurality of tasks in the specification;
means for identifying, by the second program of the task managing application, at least one of the tasks to perform based on one or more values of the data elements in the message stored in the given one of the data structures; and
means for performing, by the task managing application, the identified at least one of the tasks.

19. A non-transitory computer-readable medium storing a computer program for managing task execution in a data processing system by inputting data flow into a data processing application, the computer program including instructions for causing a data processing system to:
receive, by a task managing application executing in the data processing system, a specification of a plurality of tasks, wherein the task managing application includes a first program and a second program;
initiate, by the first program of the task managing application, execution by the data processing system of the data processing application;
process, by the data processing application of the data processing system, a data flow input into the data processing application;
generate, by the data processing application, a message including data elements, with at least one of the data elements including data based on processing of the data flow;
transmit the message to the task managing application;

intermittently receive messages by the second program that listens for messages sent from the data processing application;

store by the second program the received messages in data structures; and for each message stored in a given one of the data structures,
- start, by the second program of the task managing application, a new iteration of the plurality of tasks in the specification;
- identify, by the second program of the task managing application, at least one of the tasks to perform based on one or more values of the data elements in the message stored in the given one of the data structures; and
- perform, by the task managing application, the identified at least one of the tasks.

20. The non-transitory computer-readable medium of claim 19, wherein a dependency relationship between at least two tasks of the tasks defines at least a partial ordering for execution of functional modules corresponding to the tasks.

21. The non-transitory computer-readable medium of claim 19, wherein the plurality of tasks are to be performed by respective functional modules, wherein a dependency relationship between at least two tasks of the tasks defines conditional logic for determining at least one condition upon which execution of at least one of the functional modules is based.

22. The non-transitory computer-readable medium of claim 19, wherein the first program includes code and wherein the second program accesses or includes at least a portion of the code.

* * * * *